United States Patent

Nelson et al.

[11] Patent Number: 5,948,309
[45] Date of Patent: Sep. 7, 1999

[54] MICROWAVE OVEN BAKER ASSEMBLY

[75] Inventors: Maynard E. Nelson, Salina, Kans.; Lowell L. Vonada, 126 W. Park, Lincoln, Kans. 67455

[73] Assignee: Lowell L. Vonada, Lincoln, Kans.

[21] Appl. No.: 08/971,304

[22] Filed: Nov. 17, 1997

[51] Int. Cl.⁶ .................................................. H05B 6/80
[52] U.S. Cl. ........................ 219/734; 219/731; 219/762; 99/DIG. 14
[58] Field of Search ..................... 219/725, 734, 219/735, 731, 762; 99/DIG. 14, 451

[56] References Cited

U.S. PATENT DOCUMENTS

| | | | |
|---|---|---|---|
| 2,622,187 | 12/1952 | Welch | 219/725 |
| 4,093,841 | 6/1978 | Dills | 219/762 |
| 4,409,454 | 10/1983 | Beauvais et al. | 219/735 |
| 4,439,656 | 3/1984 | Peleg | 219/734 |
| 4,663,506 | 5/1987 | Bowen et al. | 219/734 |
| 4,745,248 | 5/1988 | Hayes | 219/762 |
| 4,880,951 | 11/1989 | Levinson | 219/731 |
| 4,908,487 | 3/1990 | Sarnoff et al. | 219/734 |
| 5,370,042 | 12/1994 | Tolchin et al. | 219/731 |
| 5,396,052 | 3/1995 | Petcavich et al. | 219/725 |
| 5,750,967 | 5/1998 | Sprauer, Jr. | 219/735 |

FOREIGN PATENT DOCUMENTS 63-315838   12/1988   Japan ..................................... 219/731

Primary Examiner—Philip H. Leung
Attorney, Agent, or Firm—Phillip A. Rein

[57] ABSTRACT

A microwave oven baker assembly including a main cooking base assembly with a top cover member releasably mounted thereon and being operable to cook a food product utilizing a cooking medium therewith. The main cooking base assembly includes a pair of adjacent cooking container members of a generally cylindrical cup-like shape separated by an intermediate separator wall; outer side walls and outer end walls; a pair of laterally extended handle members, and a top cover sealing surface engageable with a top cover member. Each cooking container member has a bottom wall with upwardly, outwardly tapered inner walls. The top cover member is provided with a cover body section integral with a top handle section and having a sealing rim section and a sealing flange section. The sealing rim section has a side wall used in conjunction with a sealing surface of the sealing flange section to provide a fluid and steam sealing condition when mounted on the main cooking base assembly and engageable with the top cover sealing surface. The cooking container members are each operable to be substantially filled with a food product, thus requiring a minimum amount of cooking medium whereupon time and energy required in a microwave cooking operation is at a minimum.

3 Claims, 1 Drawing Sheet

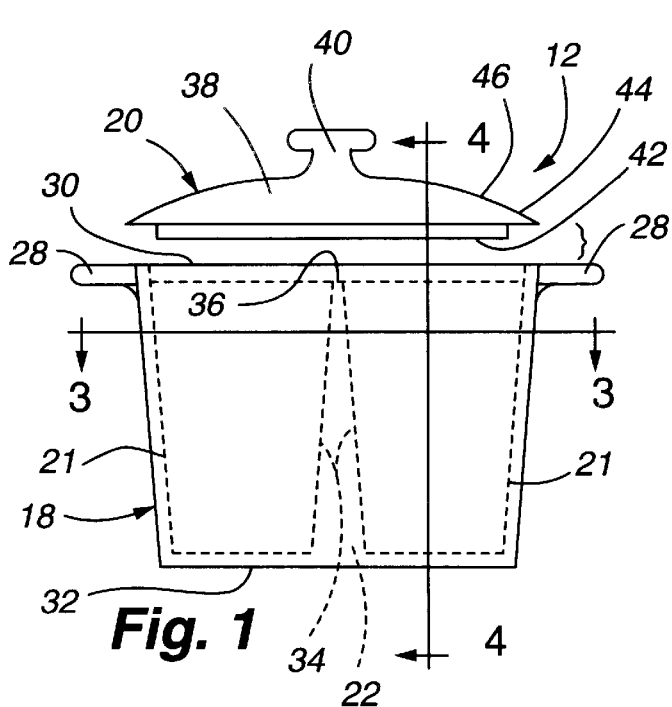
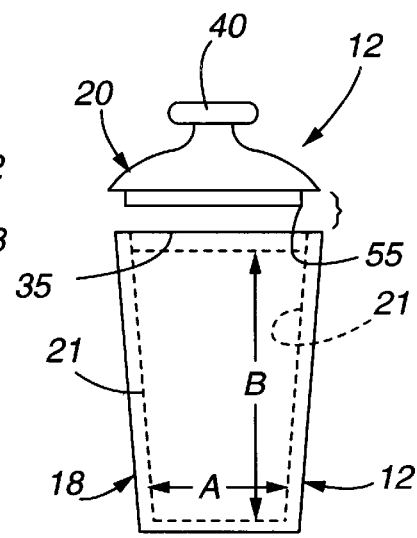
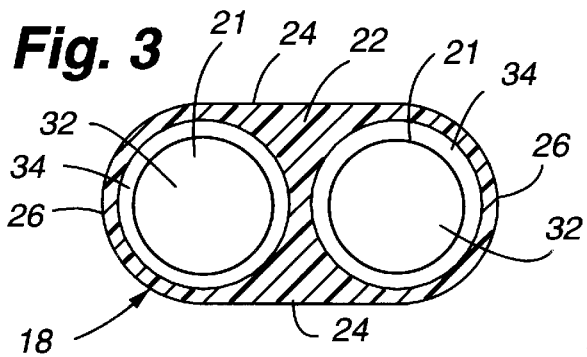
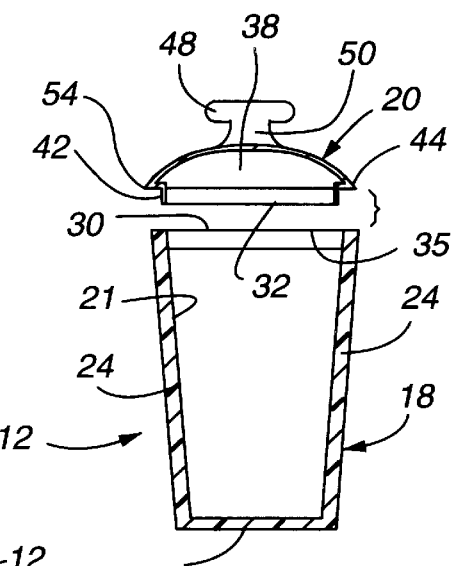
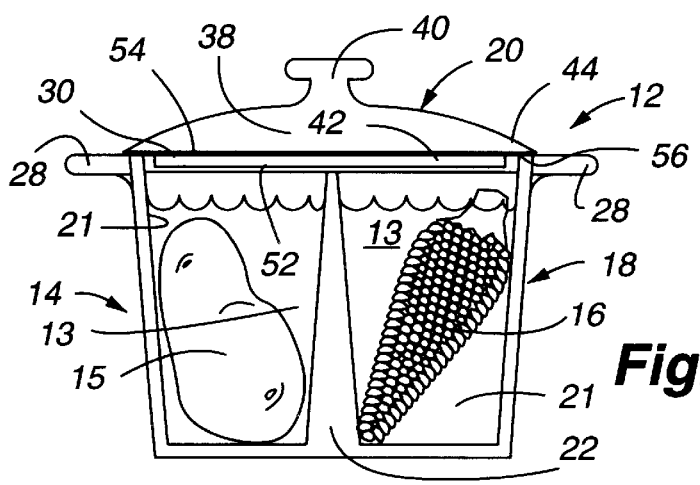

MICROWAVE OVEN BAKER ASSEMBLY

PRIOR ART

A patent search was not conducted on this invention.

PREFERRED EMBODIMENT OF THE INVENTION

In one preferred embodiment of this invention, a microwave oven baker assembly is provided in order to cook small quantities of a food product such as a potato, an ear of corn, or the like. The microwave oven baker assembly includes a main cooking base assembly having a top cover member releasably connected thereto.

The main cooking base assembly includes a pair of integrally connected cooking container members which are spaced by an intermediate separator wall and having outer side walls, outer end walls, and upper laterally extended handle members continuous with an upper top cover sealing wall or surface.

The cooking container members are of a generally cup-like shape having a bottom cooking wall with upwardly extended tapered inner walls forming the tapered cup-like shape thereto similar to a Styrofoam beverage cup container.

The cooking container members are each operable to receive a food product, such as a baking potato or ear of corn, therein and requires a minimum amount of cooking fluid, such as water, which would substantially decrease cooking time required under a microwave cooking operation as will be described.

The top cover member is provided with a main cover body section integral with a top handle section and having a sealing rim section and a sealing flange section. The cover body section has an outer arcuate body portion or surface and may be constructed of a solid material.

The top handle section has a knob portion integral with a connector portion which, in turn, is integral with the cover body section.

The sealing rim section is provided with a bottom wall defined at an outer periphery with a side wall adapted to be sealingly engaged with an entrance opening into the main cooking base assembly.

The sealing flange section extends laterally and is provided with a sealing wall in a common plane which is adapted to be sealed during a microwave cooking operation with the top cover sealing surface of the main cooking base assembly.

OBJECTS OF THE INVENTION

One object of this invention is to provide a microwave oven baker assembly including a main cooking base assembly with a pair of adjacent cooking container members having a cavity of a generally cylindrical shape with tapered walls and operable to receive a respective food product, such as a baking potato or ear of corn, therein with a minimum amount of cooking fluid, such as water, required so as to be cooked requiring a minimum amount of time and energy in a microwave oven cooking operation.

Another object of this invention is to provide a microwave oven baker assembly including a main cooking base assembly selectively covered with a top cover member and requiring a minimum amount of energy and time to readily cook a food product therein under a microwave cooking operation.

One other object of this invention is to provide a microwave oven baker assembly including a main cooking base assembly with a releasable top cover member, all being constructed of a lightweight durable microwave compatible material which would normally be of a high impact plastic or glass type material.

A further object of this invention is to provide a microwave oven baker assembly including a microwave base assembly with cooking container members, each being of a generally cylindrical shape with upwardly, outwardly tapered side walls, and operable to receive a food product in conjunction with a minimum amount of fluid cooking medium to provide for a unique cooking operation requiring a minimum amount of energy and time to properly cook the food product.

Still, one other object of this invention is to provide a microwave oven baker assembly constructed of a lightweight, durable microwave compatible material and requiring a minimum amount of energy, time, and cooking fluid to cook a food product plus being economical to manufacture; easy to use; sturdy in construction; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a side elevational view of a microwave oven baker assembly of this invention having a top cover member shown in an exploded position;

FIG. 2 is an end elevational view of the invention as illustrated in FIG. 1;

FIG. 3 is a cross sectional view taken along line 3—3 in FIG. 1;

FIG. 4 is a cross sectional view taken along line 4—4 in FIG. 1; and

FIG. 5 is a schematic diagram substantially identical to the side elevational view of FIG. 1 having a cooking fluid and food product therein during a microwave cooking operation.

The following is a discussion and description of preferred specific embodiments of the microwave oven baker assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

On referring to the drawings in detail, and in particular to FIG. 1, a microwave oven baker assembly of this invention, indicated generally at 12, is utilized with a cooking medium 13, such as water, in order to receive and cook a food product 14 in a microwave cooking oven during a cooking operation. The food product 14 can be a baking potato 15, an ear of corn 16, or other food product being subjected to a microwave oven cooking process.

As noted in FIG. 5, the cooking medium 13, which is normally water, is shown generally to cover the food product 14 during the microwave cooking operation to avoid the "rubber effect" on the food product 14 during cooking which is well known in the microwave cooking of a baking potato 15 or ear of corn 16 as will be explained in detail.

The microwave oven baker assembly 12 is constructed of a microwave compatible material which can be a rigid, durable plastic material well known in the prior art and usable in the microwave oven cooking process.

As shown in FIG. 1, the microwave oven baker assembly 12 includes a main cooking base assembly 18 having a top cover member 20 releasably connected thereto.

The main cooking base assembly 18 includes 1) a pair of cooking container members or cooking cavities 21 which are separated by an intermediate separator wall 22; 2) outer side walls 24; 3) outer end walls 26 which are integral with adjacent portions of the outer side walls 24 and cooperate to surround the cooking container members 21; 4) lateral handle members 28 which extend laterally from the outer end walls 26; and 5) an upper or top cover sealing surface 30 to provide a sealing engagement with the top cover member 20 as will be explained.

At a top of the intermediate separator wall 22 is a top wall portion 36 operable to receive and support a portion of the top cover member 20 thereon as will be noted.

Each cooking container member 21 is generally of a cylindrical cup-like shape having a bottom wall 32 integral with an upwardly extended tapered inner wall 34 leading to an upper common entrance opening 35.

The adjacent, spaced cooking container members 21 are superior to utilizing a general cooking pan with a large normally cylindrical cooking area which requires a large amount of the cooking medium 13 to cook a food product 14 therein.

The enclosed compact cooking container members 21 provide a limited area to snugly receive a baking potato 15 or an ear of corn 16 requiring a minimum amount of cooking medium 13 thereby achieving a cost efficient amount of time and energy to cook the food product 14 as will be described in detail.

The outer side walls 24, the outer end walls 26, and the intermediate separator wall 22 are of a minimum amount of material thickness so as to reduce time required for cooking the food product 14 in the respective cooking container members 21.

The lateral handle members 28 are adapted to be grasped by the hand of a person utilizing the main cooking base assembly 18 for easy of movement and conveyance into and out of a microwave cooking oven in a conventional manner.

A top surface of the lateral handle members 28 lie in the same plane with the top cover sealing surface 30 for sealing engagement with the top cover member 20 as will be explained.

The top cover member 20 is of an oblong shape having an outer periphery operable to engage the top cover sealing surface 30 within the common entrance opening 35 in order to prevent discharge of the cooking medium 13, in the form of liquid or steam, from the cooking container members 21.

The top cover member 20 includes a cover body section 38 integral with a top handle section 40 and provided with a sealing rim section 42 and a sealing flange section 44.

The cover body section 38 has an arcuate body portion 46 extended from the top handle section 40 to the sealing flange section 44.

The top handle section 40 is provided with a knob portion 48 integral with a connector portion 50 which, in turn, is integral with a top portion of the arcuate body portion 46.

The sealing rim section 42 is provided with a bottom wall 52 integral with a peripheral side wall 54. The side wall 54 is provided with a peripheral edge 55 positioned adjacent the top wall portion 36 to provide a seal therewith.

The side wall 54 is received within the upper common entrance opening 35 into the cooking container members 21 of the main cooking base assembly 18.

The sealing rim section 42 provides a fluid and steam seal with the main cooking base assembly 18 which is important during a microwave cooking operation as will be described.

The sealing flange section 44 includes a sealing wall or surface 56 extended in a generally common plane and operable, when mounted on the main cooking base assembly 18, to provide a fluid and steam seal with the top cover sealing surface 30.

As noted in FIG. 5, there is a substantial sealing of the sealing wall 56 with the top cover sealing surface 30 when the top cover member 20 is placed on the main cooking base assembly 18 for use in a microwave cooking operation. The top cover member 20 can be constructed of a solid material to add weight thereto and achieve a more positive sealing between the sealing surface 56 and the top cover sealing surface 30.

The sealing of the side wall 54 with the common entrance opening 35 of the main cooking base assembly 18 would further contribute to a positive sealing to keep the fluid and steam generated by the cooking medium 13 within the cooking container members 21 to achieve a more economical and faster microwave cooking process.

USE AND OPERATION OF THE INVENTION

In the use and operation of the microwave oven baker assembly 12 of this invention, it is obvious that a food product 14 to be cooked, such as a baking potato 15, ear of corn 16, or other similar food product, can be placed within respective ones of the cooking container members 21 as noted in FIG. 5.

Next, the cooking medium 13, which is normally water, is placed within respective ones of the cooking container members 21 to cover the food product 14 as indicated in FIG. 5.

Due to the limited conical cup or cup-like shape of the respective cooking container members or cooking cavities 21, a minimum amount of cooking medium 13 is required to be placed therein to cover the respective baking potato 15 and the ear of corn 16 as noted in FIG. 5. This is important as the minimum amount of the cooking medium 13 required would shorten the resultant microwave oven cooking time required, thus saving time and energy during a microwave cooking process.

Next, the user of the microwave oven baker assembly 12 would place the top cover member 20 on the main cooking base assembly 18 as noted in FIG. 5 and place the combination into an interior cooking area of a microwave oven (not shown).

Then, a cooking control knob would be activated on the microwave oven after an entrance door assembly has been closed to initiate a microwave cooking process. During the microwave cooking process, the cooking medium 13 always extends upwardly from the food product 14 to prevent what is commonly known as "rubber effect" of food being cooked in a microwave oven not covered by the cooking medium 13.

Due to the small amount of cooking medium 13 required, the microwave oven baker assembly 12 is operable to cook the food product 14 with in a minimum amount of time and energy required. This achieves a unique microwave cooking process best used for cooking by one person in a highly efficient and effective manner to achieve a high quality of a finished cooked food product 14.

As noted in FIG. 2, the cooking container members 21 have a bottom wall width "A" of one-half a side wall height "B" and this ratio of 1 to 2 could be increased to 1 to 3 or 1 to 4 depending on the food product 14 to be cooked therein.

The microwave oven baker assembly of this invention is sturdy in construction; economical to manufacture; easy to maintain; requires a minimum amount of knowledge and skill to use; and is substantially maintenance free.

While the invention has been described in conjunction with preferred specific embodiments thereof, it will be understood that this description is intended to illustrate and not to limit the scope of the invention, which is defined by the following claims:

We claim:

1. A microwave oven baker assembly, comprising:
   a) a main cooking base assembly having a top cover member releasably connected thereto;
   b) said main cooking base assembly includes a cooking container member of a cup-like shape to receive a food product therein having a height greater than a width thereof and the food product is covered by a cooking medium requiring a small amount of time and energy to cook the food product the cooking medium during a microwave oven cooking process;
   c) said top cover member having a cover body section integral with a top handle section and having a sealing flange section with a sealing surface thereon and a sealing rim section;
   d) said main cooking base assembly having a top cover sealing surface sealingly engaged with said sealing surface on said sealing flange section to provide a fluid and steam seal therebetween operable during the microwave cooking process to achieve a final cooked food product using a small amount of cooking medium;
   e) said top cover member constructed of a solid material to add substantial weight thereto so as to be sealingly engageable with said main cooking base assembly when mounted thereon during a microwave oven cooking process; and
   f) said sealing rim section having a bottom wall and a side wall sealingly engageable with said main cooking base assembly;
   whereby said cooking container member of a size to receive a food product and the cooking medium to cover the food product and then subjected to a microwave cooking process.

2. An oven baker assembly, comprising:
   a) a main cooking base assembly with a top cover member releasably mounted thereon;
   b) said main cooking base assembly having a cooking cavity with a bottom wall, a side wall, and an end wall of a minimum amount of material thickness; and said cooking cavity having a height size over twice a width size;
   c) said cooking cavity having said bottom wall with upwardly, outwardly, inclined side walls to receive the food product therein and having a width of said cooking cavity of one-half the height thereof to receive a food product therein and a cooking medium to cover same;
   d) a plurality of said cooking cavities being provided, each to receive a respective food product therein and covered by the cooking medium requiring a small amount of time and energy to cook the food product and heat the cooking medium during a microwave oven cooking process;
   e) said top cover member constructed of a solid material to add substantial weight thereto so as to be sealingly engageable with said main cooking base assembly when mounted thereon during a microwave oven cooking process;
   f) said top cover member having a sealing rim section and a sealing flange section;
   g) said sealing rim section having a bottom wall and a side wall sealingly engageable with said main cooking base assembly; and
   h) said sealing flange section having a sealing surface engageable with a top cover sealing surface on said main cooking base assembly to provide a fluid and steam seal therewith to decrease an amount of time and energy required to cook the food product in the microwave oven cooking process;
   whereby said cooking cavity filled with the food product, and said cooking cavity to receive the food product and the cooking medium covering the food product therein requiring a small amount of input heat required to cook the food product and heat the cooking medium.

3. An oven baker assembly, comprising:
   a) a main cooking base assembly with a top cover member releasably mounted thereon;
   b) said main cooking base assembly having a cooking cavity with a bottom wall, a side wall, and an end wall of a minimum amount of material thickness;
   c) said cooking cavity having said bottom wall with upwardly, outwardly, inclined side walls to receive a food product therein and a cooking medium to cover same;
   d) said cooling cavity covered by the cooking medium requiring a small amount of time and energy to cook the food product and heat the cooking medium during a microwave cooking process;
   e) said top cover member constructed of a solid material to add substantial weight thereto so as to be sealingly engageable with said main cooking base assembly when mounted thereon during a microwave oven cooking process;
   f) said top cover member having a sealing rim section and a sealing flange section;
   g) said sealing rim section having a bottom wall and a side wall sealingly engageable with said main cooking base assembly; and
   h) said sealing flange section having a sealing surface engageable with a top cover sealing surface on said main cooking base assembly to provide a fluid and steam seal therewith to decrease an amount of time and energy required to cook the food product in the microwave oven cooking process.

* * * * *